(12) United States Patent
Wagner

(10) Patent No.: US 7,955,202 B2
(45) Date of Patent: Jun. 7, 2011

(54) HYDRAULICALLY CONTROLLED CONE DISC CONTINUOUSLY-VARIABLE TRANSMISSION

(75) Inventor: Peter Wagner, Bad Homburg (DE)

(73) Assignee: PIV Drives GmbH, Bad Homburg (DE)

( * ) Notice: Subject to any disclaimer, the term of this patent is extended or adjusted under 35 U.S.C. 154(b) by 49 days.

(21) Appl. No.: 11/828,295

(22) Filed: Jul. 25, 2007

(65) Prior Publication Data

US 2008/0026904 A1    Jan. 31, 2008

(30) Foreign Application Priority Data

Jul. 29, 2006   (DE) .......................... 10 2006 035 264

(51) Int. Cl.
*F16H 59/00* (2006.01)
*F16K 11/044* (2006.01)

(52) U.S. Cl. ........................................................ 474/28

(58) Field of Classification Search .................. 477/50, 477/45–49, 125–126; 303/117.1; 137/625.66; 251/49, 50; 474/8, 18, 28; 475/127–133
See application file for complete search history.

(56) References Cited

U.S. PATENT DOCUMENTS

| | | | | |
|---|---|---|---|---|
| 3,934,830 A | * | 1/1976 | Grau | 242/485.9 |
| 4,543,977 A | * | 10/1985 | Arav | 137/115.17 |
| 5,443,308 A | * | 8/1995 | Stegmaier | 303/115.4 |
| 5,447,176 A | * | 9/1995 | Asou et al. | 137/625.66 |
| 2004/0047749 A1 | * | 3/2004 | Roberts et al. | 417/395 |
| 2006/0105868 A1 | * | 5/2006 | Moorman | 474/28 |

FOREIGN PATENT DOCUMENTS

| | | | |
|---|---|---|---|
| DE | 1264196 B | * | 3/1968 |
| DE | 3914792 A1 | * | 11/1990 |
| DE | 20 2004 013595 | | 1/2006 |
| DE | 10 2005 053699 A1 | | 5/2006 |
| DE | 102006035264 A1 | * | 1/2008 |
| EP | 0 881 414 A1 | | 12/1998 |
| EP | 1 557 591 A2 | | 7/2005 |
| EP | 1557591 A2 | * | 7/2005 |
| EP | 1630637 A1 | * | 3/2006 |
| JP | 05050911 A | * | 3/1993 |

OTHER PUBLICATIONS

Extended European Search Report for corresponding EU patent application; Aug. 23. 2010.

* cited by examiner

*Primary Examiner* — Bradley T King
*Assistant Examiner* — Stephen Bowes
(74) *Attorney, Agent, or Firm* — Egbert Law Offices PLLC

(57) ABSTRACT

The invention concerns a continuously variable cone disc transmission with sets of discs mounted on drive and driven shafts. The sets of discs are each hydraulically adjustable axially in their distance from each other whereby the traction train circulating between them is able to adjust to different running circles and thereby enabling a continuously variable transmission. The pressure fluid needed for the hydraulic actuation is supplied to the pressure cylinders by a pump through a control valve. This control valve is actuated hydraulically by a pressure supply that is need-adjusted by a proportional-pressure reduction valve. In the event of a functional failure and consequent loss of the regulating pressure, the control valve is automatically arrested in position, so that the control valve is prevented from giving a command for the sudden change of the transmission ratio into an extreme position.

3 Claims, 3 Drawing Sheets

HYDRAULICALLY CONTROLLED CONE DISC CONTINUOUSLY-VARIABLE TRANSMISSION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns a cone disc continuously-variable transmission with pairs of cone discs mounted on drive and driven shafts, with one of the cone discs being fixed on the shaft and one of each being axially movable on the shaft, and between which a traction train circulates for power transfer. Together with pistons fixed on the shafts, the axially movable cone discs form cylinder-piston-aggregates. The cylinder-piston-aggregates are supplied by a pump via a control valve with a pressure medium for the setting and maintenance of the gear ratio. The control pressure actuating the control valve is determined as needed by a proportional pressure reducing valve (PV) which is influenced by a control and computer unit which in turn receives the necessary gear ratings from sensors and converts these into appropriate electrical signals. The control pressure acts in a pressure chamber against a piston valve supported by spring elements.

2. Description of Related Art Including Information Disclosed Under 37 CFR 1.97 and 37 CFR 1.98

Gears of this class with hydraulic adaptation of the cone discs are known in their basic technology, for instance, through German patent No. DE-A-12 64 196. There the ratio setting is made by mechanical control of the position of the piston valve. A further development of such transmissions with hydraulic contact pressure on the cone discs and also with hydraulically controlled gear ratio setting is known for instance from German patent No. DE-A-39 14 792.

With gears of the latter type, it is possible to have a failure of control pressure which is necessary for the adjustment of the piston valve position and which controls the ratio setting of the transmission. This is so because this control is made with an electronic computer and control unit which acts appropriately on the proportional pressure reducing valve (PV). During a power failure, for instance, this control cannot be maintained. The piston valve moves in an uncontrolled manner, and the control pressure is lost.

During such a pressure failure, the piston valve is moved by the associated spring into an end position which corresponds to a command for a sudden change of the set gear ratio into an extreme position. Depending on the hydraulic flow in the pressure lines from the control valve to the set of drive discs or driven discs respectively, in accordance with the actual requirements in the desired application, this may cause a change of the gear ratio either to acceleration or to deceleration.

Such an involuntary change of gear ratio can cause considerable problems. If, for instance, the drive is connected to a major inert mass, a change command to "Slow" would mean a possibly significant acceleration of the drive engine for the drive side. Applied to the motor vehicle drive, this signifies, for example, that during a sudden gear ratio change to "Slow" (comparable to a manual transmission being suddenly shifted into first gear during high speed), the entire vehicle, acting as an inert mass, forces the engine to high or excessive RPM. This can cause not only damage to the engine but also to the entire drive train.

And it should also be mentioned that such an occurrence on a motor vehicle could also have traffic consequences, when due to the sudden braking, the vehicle gets out of control. It could also lead to a wrong reaction on the part of the driver of the vehicle, with corresponding consequences.

A change to "Fast", on the other hand, can lead to an overload on parts of the drive train, if, for instance, the driving motor is a synchronous machine tied into the power circuit.

One can also think of applications where large inert masses are present on the drive side and on the power take-off side.

BRIEF SUMMARY OF THE INVENTION

It is therefore the aim of the present invention to prevent, in case of a failure, a sudden change command to an extreme gear ratio as described above, and to maintain the set-up gear ratio as much as possible, so that no overload of components and none of the other drawbacks or hazards as described above can occur.

According to the invention, this aim is achieved by the piston valve being connected to a clamping device which would immobilize it, during a pressure loss as described above, in its actual position at that moment.

It is true that German patent application No. DEA-10 2004 03 391 already describes how an appropriate piston valve is arrested during a pressure loss by bracing it during a pressure loss with a spring against a closed hydraulic chamber. The disadvantage here is that because of a leakage in this hydraulic chamber it is still possible to experience an involuntary change of the position of the piston valve. This is most efficiently prevented by the present proposal of locking the piston valve by means of a clamping device.

In particular it is proposed to provide the clamping device in a mechanical form and to furnish it as its actuator with a helical spring which is tensed against the pump pressure.

On the one hand, this has the advantage that even in the event of a pump pressure failure, the clamping device will de-activated automatically without any additional separate elements being required. Besides, this type of construction is operationally very reliable.

On the other hand, it is also possible to provide an actuator, other than a mechanical helical spring, with a pneumatic or hydraulic actuation. In addition, a version with permanent magnets as actuators is also being proposed.

The pressure acting against the actuator is preferably released over a relief valve which, in the event of a failure or loss of pressure, can also be activated by a control, if necessary.

Hereby the field of application of the object in accordance with the invention is expanded, in so far as the clamping device is not only activated by a pressure loss due to a pump failure, but also by a different, possibly even an electronically detected error.

In an especially preferred version, the actuator acts upon a piston by which the piston valve is fixed. It would be within the scope of the invention, if the piston, which is moved by the actuator, fixes the piston valve with a face turned away from the actuator.

But in a preferred version, this face is provided with a conic recess. This conic recess corresponds with a radially slit, essentially a truncated clamp bushing.

By actuating the piston, the conic recess is pushed over the clamp bushing thus radially reshaping the clamp bushing which leads to the clamping of the piston valve. This has proven to be an operationally reliable version.

The clamping could work here directly in the radial direction on the piston valve. But it is especially proposed to have the clamp bushing work on a piston rod coupled to the piston valve. This has the advantage that a separate component is provided for the clamping, thus avoiding the need to perform the clamping on sensitive surfaces of the piston valve.

BRIEF DESCRIPTION OF THE SEVERAL VIEWS OF THE DRAWINGS

Additional advantages and characteristics of the invention become apparent in the following description of examples of execution.

DETAILED DESCRIPTION OF THE INVENTION

Figure 1:
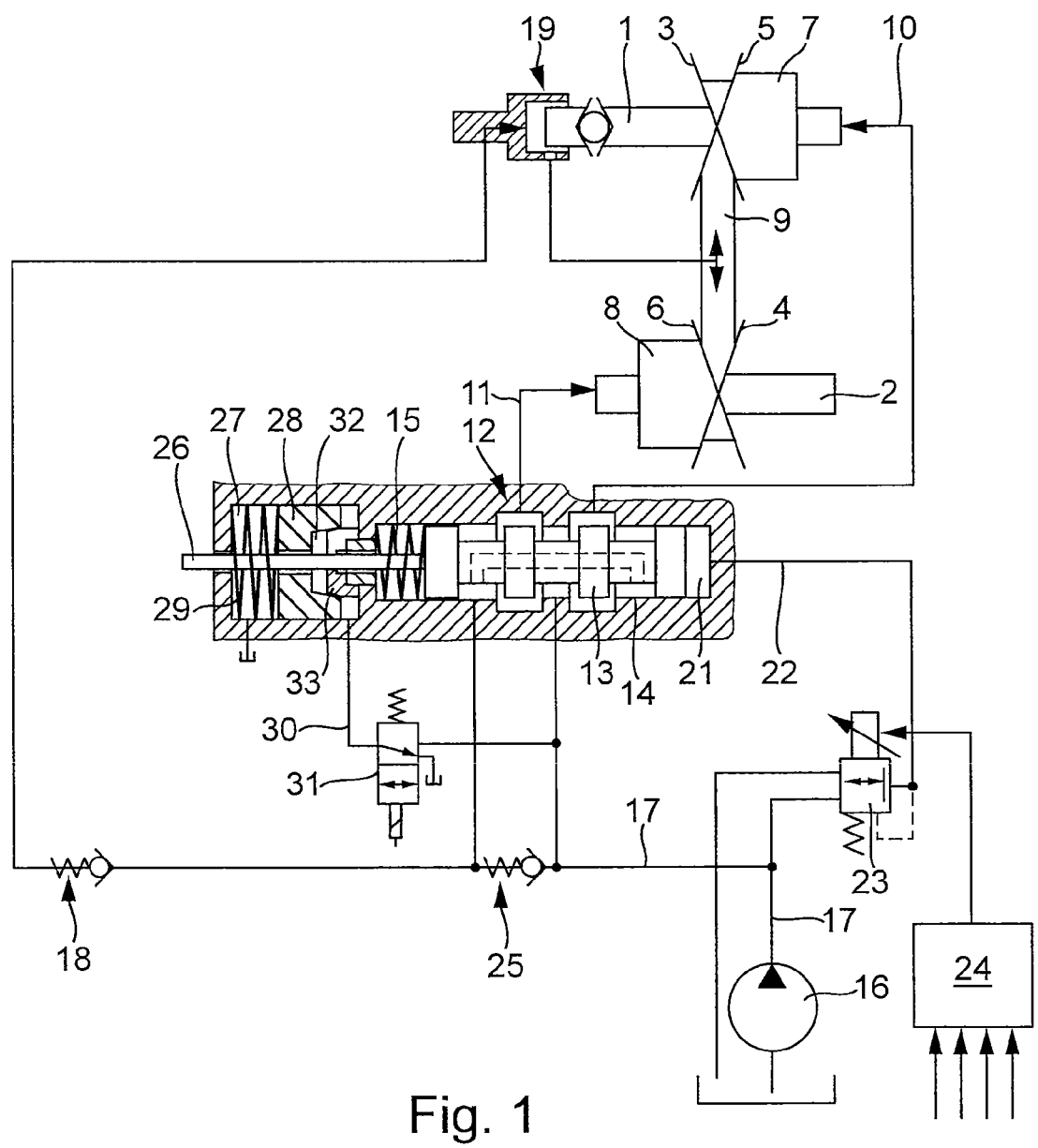
FIG. 1 shows a schematic view of a hydraulic diagram of a hydraulically pressed gearbox with electro-hydraulic control and a clamping device with a spring for the piston valve.

In FIG. 1, one identifies an infinitely-variable gearbox with two sets of discs arranged on two parallel shafts 1 and 2. These each consist of a cone disc 3 or 4 respectively, fixed to the shaft, and a cone disc 5 or 6 respectively that is torsionally connected with the shaft but that is axially slidable. The slidable cone discs 5 and 6 can be actuated by means of the corresponding pressure cylinders 7 or 8.

Both pairs of cone discs are frictionally connected to each other by a traction mechanism 9 that circulates between them.

Through the conduits 10 and 11 the pressure cylinders 7 and 8 are provided with a pressure fluid from a control valve 12. This control valve is in the form of a so-called square spool valve, with a piston valve 13 being axially movable inside an appropriate housing 14 and resting against a spring element 15.

A pressure fluid is supplied to this control valve 12 by a pump 16 over a conduit 17. In order to maintain a desired base pressure, there is an optional servo-valve 18 which together with a topped torque sensor 19 constitutes the hydraulic discharge over a conduit 20.

The control valve 12 is supplied, as needed for its adjustment over a conduit 22 into a pressure chamber 21, with a pressure fluid at the pilot pressure PA through the proportional pressure reducing valve (PV) 23. In this way, the piston valve 13 in housing 14 is moved axially against the spring element 15, thus achieving either the retention or the change of the gear ratio.

As to the proportional-pressure reducing valve 23, it receives the pressure fluid from the pump 6 and is controlled by an electric or electronic control and computer unit 24. This unit receives its necessary information over sensors (not shown) on the basis of which it controls the PV 23.

Customarily the hydraulic circuit also contains a differential pressure valve 25.

In the event of a power failure, the electric or electronic control and computer unit 24 is no longer able to function. Due to the missing control by the control and computer unit 24 the PV 23 also fails, and the pressure PA in the pressure chamber 21 is consequently no longer regulated. This causes the piston valve 13 to be moved in an unregulated manner, which can result in the gearbox switching in an uncontrolled manner to acceleration or deceleration.

In order to prevent this, the example of execution presented here features a thin piston rod 26 which is attached to the piston valve 13. It runs into a pressure chamber 27 which it traverses in the axial direction.

Located in this pressure chamber is a clamping device which features a piston 28 that is axially movable in the pressure chamber 27, parallel to the piston rod 26. On one side this piston is subjected to a helical spring 29 in a pressure-free section of the pressure chamber 27, and on its opposite side the piston 28 sustains the pump pressure of the system customarily provided by pump 16. This pressure is supplied over a duct 30 and fixes the piston 28 against the force of the spring 29.

In the event of an operational failure the duct 30 is abruptly depressurized by a valve 31 located in this duct, so that the spring 29 is able to axially move the piston 28 to the right as shown in the drawing.

On its off-spring 29 side, the piston 28 features a conic recess parallel to the axis which corresponds to a truncated clamp bushing 33 that is also parallel to the axis and slotted radially in axial direction. This clamp bushing is traversed by the piston rod 26 in axial direction.

During the described axial movement of the piston 28, its conic recess 32 is being pushed over the clamp bushing 33 and reshapes it in a radial direction towards the interior so that the piston rod 26 is thus arrested by the clamp bushing 33. This, in turn, arrests in its position the piston 13 which is coupled to the piston rod, thereby preventing an involuntary change of the gear setup.

In this way, a mechanical, reliably functioning possibility exists for providing emergency service for a variable cone disc gearbox.

Figure 2:
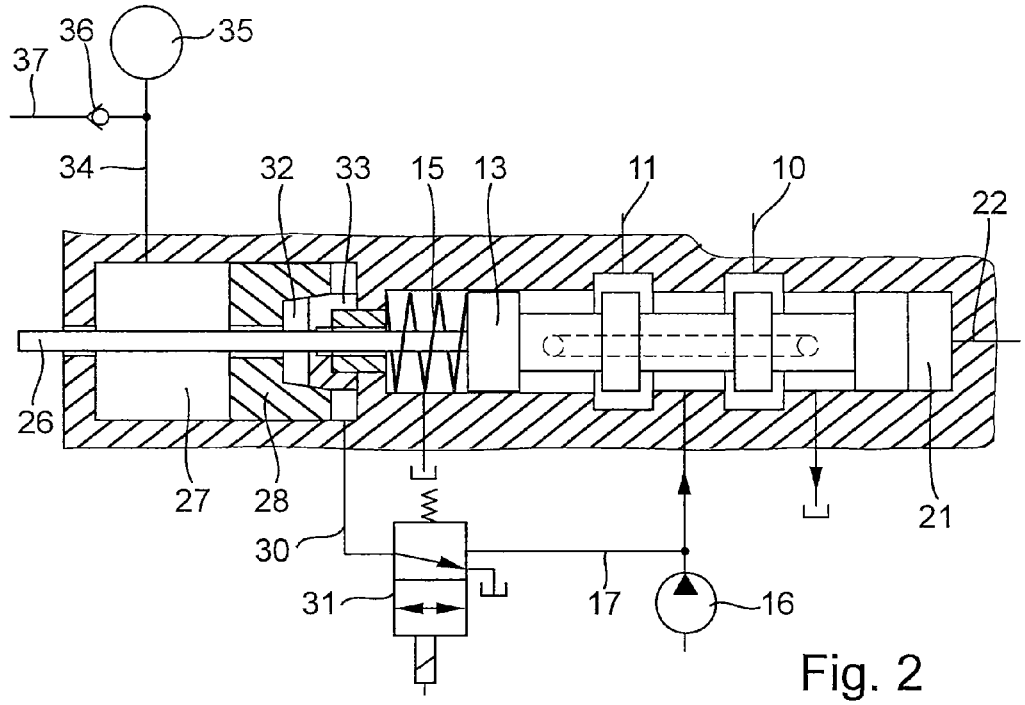
FIG. 2 shows a schematic view of a diagram of a clamping device with pneumatic actuation for the piston valve.
Figure 3:
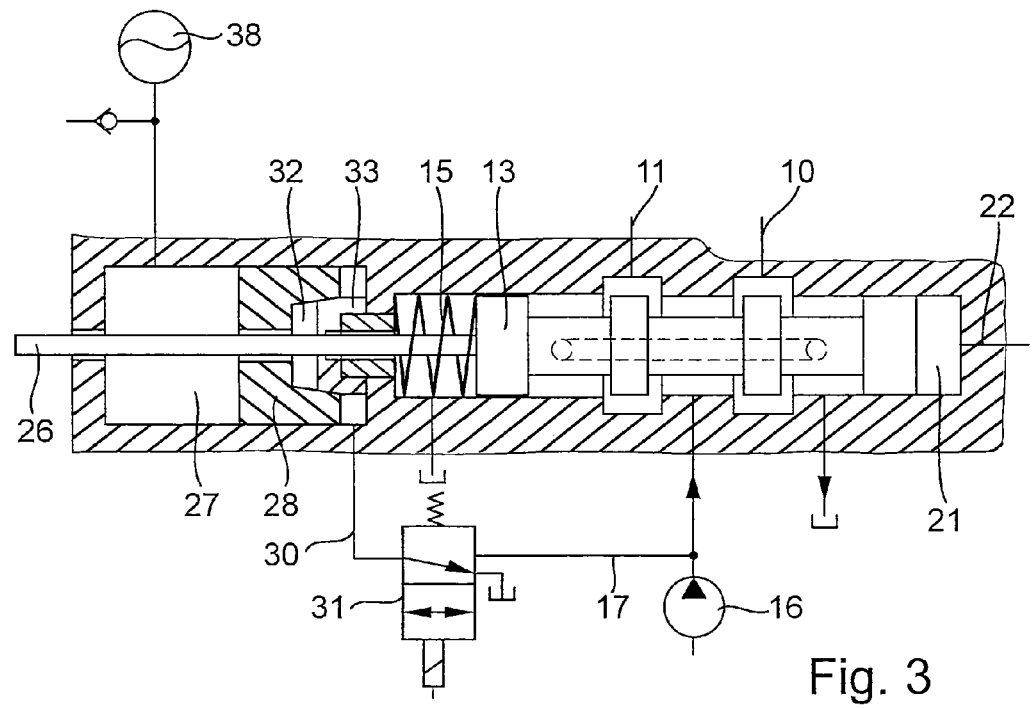
FIG. 3 shows a schematic view of a diagram of a clamping device with hydraulic actuation for the piston valve.
Figure 4:
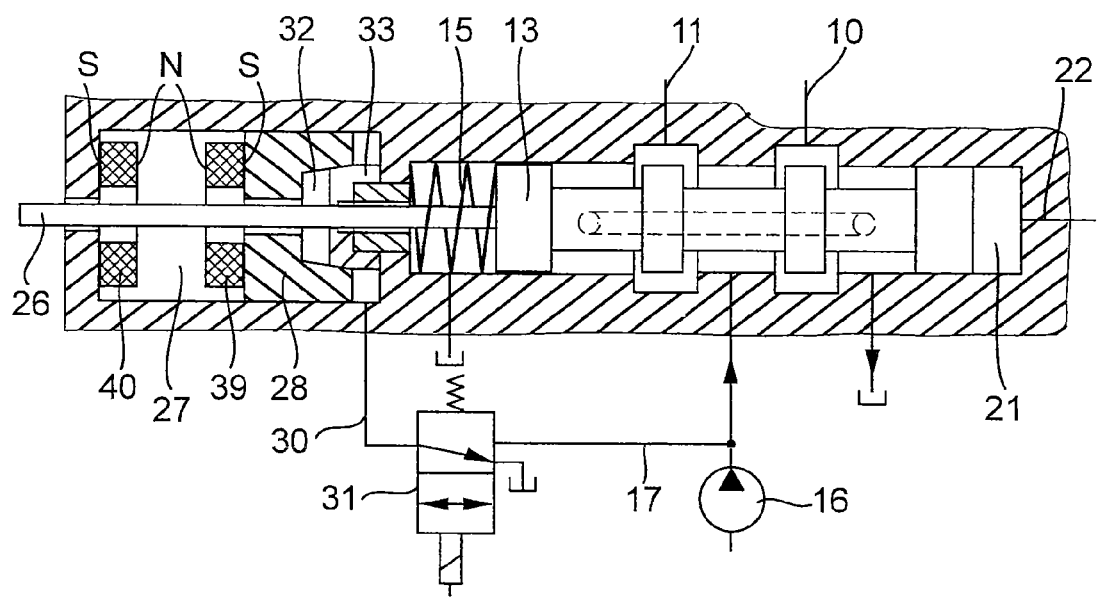
FIG. 4 shows a schematic view of a diagram of a clamping device with actuation for the piston valve by means of permanent magnets.

Additional versions of execution are presented in FIGS. 2 to 4, where identical elements are given the same reference numbers.

What is different in the additional examples of execution are the automatic actuating mechanisms for the clamping device.

In FIG. 2, a pneumatic actuation is provided: the pressure chamber 27, which is closed off by piston 28, is here supplied with compressed air over a duct 34 which is connected to a compressed-air storage tank 35. Over the already mentioned duct 34, an appropriate pressure is pneumatically built up in the pressure chamber 27 by means of a supply line 37 which is equipped with a check valve 36. When the pressure in duct 30 is lost, the piston 28 is pushed by the pneumatic pressure generated as described above, with its conic recess 32 over the clamping bushing 33, thereby arresting the thin piston rod 26 in its axial position which also fixes the piston 13 of the square spool valve 12.

Instead of a pneumatic activation by means of a compressed-air storage tank one may also provide a hydraulic actuator for the clamping device. In this case the pressure chamber 27 is connected to a hydraulic storage tank 38. In this version of execution the piston 28 which closes off the pressure chamber 27 is pushed by the appropriate hydraulic fluid to the right in the event of depressurization of duct 30 and thus clamps, as described, the thin piston rod 26, in order to arrest the piston 13 of the square spool valve as described before.

In order to avoid the construction expenditure necessary for either the pneumatic or the hydraulic actuation of the piston 28, an additional variant is proposed in FIG. 4, where permanent magnets 39 are juxtaposed inside the pressure chamber 27, parallel to the axis of the thin piston rod 28, these magnets being oppositely poled and therefore mutually repelling.

This has the effect that during depressurization of duct 30, the piston 28 (due to the permanent magnet 39 attached to it being pushed by the oppositely poled permanent magnet 40 located in the pressure chamber 27) is being pushed with its conic recess 32 onto the clamping bushing 33, thus achieving the desired clamping effect as already described several times above.

All these variants reveal each an effective possibility to achieve the desired arresting of the piston valve in a CVT, continuously variable transmission, and thus to provide a means which prevents a continuously variable cone disc transmission from performing undesirable change movements in extreme situations.

I claim:

1. A continuously variable cone disc transmission comprising:
   a drive shaft;
   a driven shaft;
   a first pair of cone discs received on said drive shaft such that one cone disc of said first pair of cone discs is fixed to said drive shaft and such that the other cone disc of said first pair of cone discs is axially movable on said drive shaft;
   a second pair of cone discs received on said driven shaft such that one cone disc of said second pair of cone discs is fixed to said driven shaft and such that the other cone disc of said second pair of cone discs is axially movable on said driven shaft;
   a traction training means extending between said first and second pairs of cone discs for transferring power between said first and second pairs of cone discs;
   a first piston-and-cylinder assembly connected to said drive shaft;
   a second piston-and-cylinder assembly connected to said driven shaft;
   a pumping means connected to said first and second piston-and-cylinder assemblies for setting a transmission ratio therebetween by supplying a pressurized fluid thereto;
   a control valve fluidically cooperative with said pumping means, said control valve being a square spool valve, said control valve comprising:
      a housing;
      a piston valve positioned in said housing;
      a piston rod connected to said piston valve and extending through said housing;
      a clamp bushing positioned in said housing, said piston rod extending through said clamp bushing, said clamp bushing having a truncated portion slotted radially in an axial direction;
      a piston positioned in said housing, said piston having a conical recess, said piston movable between a first position away from said clamp bushing and a second position in which said conical recess receives said truncated portion therein such that said clamp bushing radially closes so as to lock said piston rod and said piston valve in a position; and
      a spring element positioned in said housing and resiliently bearing against said piston; and
   a proportional pressure reducing valve fluidically connected between said pumping means and said control valve so as to supply the pressurized fluid to said piston valve, said piston moving to said second position when a loss of pressure of the pressurized fluid occurs.

2. The continuously variable cone disc transmission of claim 1, said spring being tensioned against the pressure of said pumping means.

3. The continuously variable cone disc transmission of claim 1, further comprising:
   a relief valve fluidically cooperative with said control valve, said relief valve being actuated by the loss of pressure.

* * * * *